United States Patent [19]

Hirn et al.

[11] 4,260,280
[45] Apr. 7, 1981

[54] ROAD ROLLER

[75] Inventors: Ferdinand Hirn, Aigen/Ennstal; Manfred Edlinger, Steinach, both of Austria

[73] Assignee: Voest-Alpine Aktiengesellschaft, Linz, Austria

[21] Appl. No.: 14,906

[22] Filed: Feb. 26, 1979

[30] Foreign Application Priority Data

Mar. 3, 1978 [AT] Austria ................................. 1518/78

[51] Int. Cl.³ .............................................. E01C 19/26
[52] U.S. Cl. ................................... 404/122; 404/117; 180/20; 296/196
[58] Field of Search ............... 404/122, 124, 117, 125, 404/123, 126, 127, 128; 180/12, 13, 20, 51; 296/196

[56] References Cited

U.S. PATENT DOCUMENTS

| | | | |
|---|---|---|---|
| 2,710,770 | 6/1955 | Barenyi | 296/196 |
| 2,943,541 | 7/1960 | Dunn | 404/122 |
| 3,280,931 | 10/1966 | Cahill | 180/12 X |
| 3,477,535 | 11/1969 | Wyatt | 180/20 |
| 3,478,833 | 11/1969 | Breon | 180/12 |
| 3,844,671 | 10/1974 | Domenighetti | 404/117 |
| 3,868,194 | 2/1975 | Ferguson | 180/20 X |
| 3,876,023 | 4/1975 | Hushower | 180/12 X |
| 3,912,409 | 10/1975 | Herbst | 404/122 |

*Primary Examiner*—Nile C. Byers, Jr.
*Attorney, Agent, or Firm*—Kurt Kelman

[57] ABSTRACT

A road roller comprises a central frame part, a main drive including a hydraulic pump and a steering control carried by the main frame part. Replaceable roller units each including a frame part detachably mounted on the central frame part at a front and rear end, respectively, of the central frame part comprise front and rear rollers. A hydraulic motor and a hydraulic steering mechanism are incorporated in at least one of the roller units, the hydraulic motor being connected to the hydraulic pump to be powered thereby for driving the roller and the steering mechanism being connected to the steering control for steering the roller.

3 Claims, 10 Drawing Figures

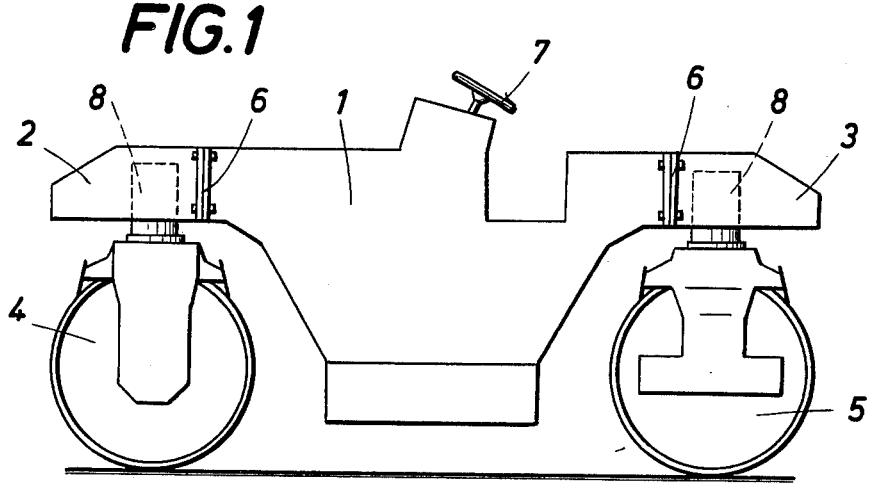
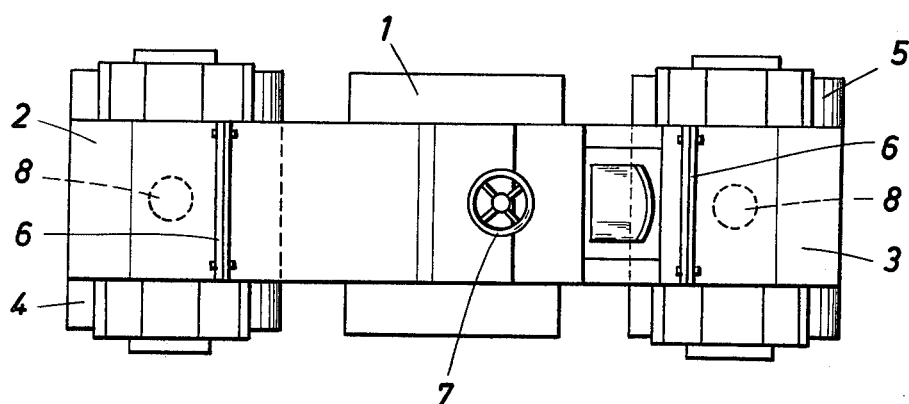
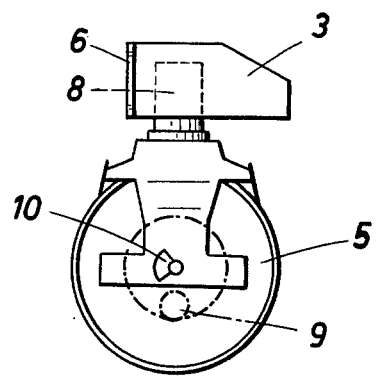
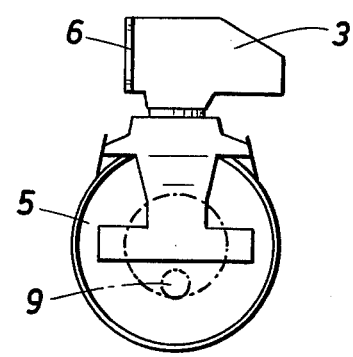

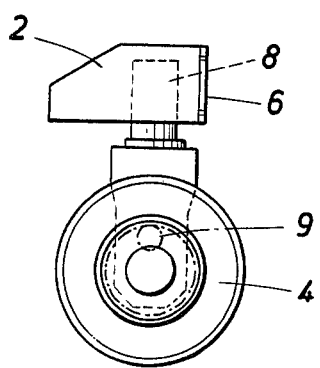
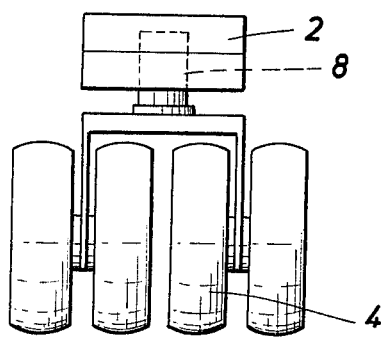
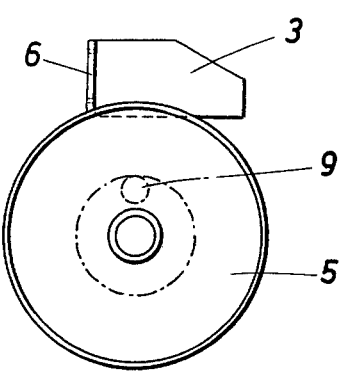
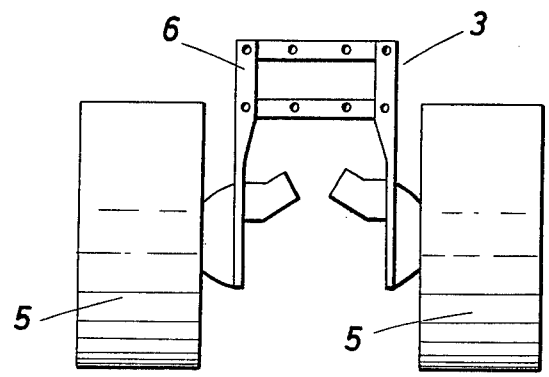
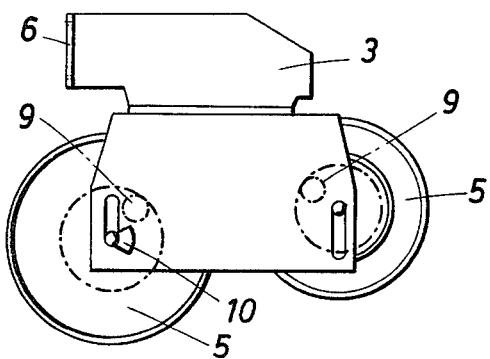
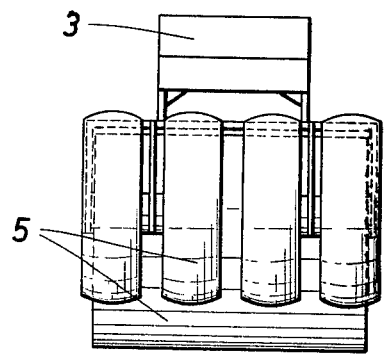

ROAD ROLLER

This invention relates to a road roller comprising a central frame part which carries a front roller unit and a rear roller unit, and a drive motor, is mounted on the central frame part and through the intermediary of at least one pump and at least one hydraulic motor drives the front and/or rear roller units. The front roller unit and/or the rear roller unit is provided, if desired, with a vibrator and is steerable by hydraulic steering means.

Because various compacting and smoothening tools are required for the various operations involved in road building and because it is not possible to perform all these operations with the same road roller units, two or more road rollers of different types must be used on almost every building site. This obviously adds greatly to the operating costs. For this reason, it has been proposed to provide road rollers with axle units having replaceably mounted rollers or wheels so that one road roller can be used for different operations. Because it is possible only to replace axle unit rollers or axle unit wheels against differently shaped rollers or wheels, the field of use of these road rollers having replaceable rollers or wheels remains highly restricted.

All requirements could be met only by a road roller which in dependence on the desired use can be changed from one-axle steering system to an all-wheel steering system, from a one-axle drive system to an all-wheel drive system, or to comprise a vibrated roller unit, in which case rollers of the corresponding types would also have to be used.

The invention is based on the intention to accomplish that object and so to improve a road roller of the kind described first hereinbefore that it can be altered in a simple manner to be suitable for any operation to be performed.

This object is accomplished with front and rear roller units forming together with any associated hydraulic motor, hydraulic steering means and optionally, a vibrator replaceable units including a frame part detachably mounted on the central frame part. As each of the front and rear roller units together with any associated hydraulic motor, hydraulic steering means and vibrator is replaceable, the self-supporting central frame part may be identical for all types of road rollers. When a road roller of a desired kind has been provided by mounting the required replaceable units on the central frame part, all that is required to make the road roller ready for operation is to connect the hydraulic means in the central frame part to the respective hydraulic means in the roller units. This modular concept provides not only a high flexibility of the roller for various operations required in road building but also simplifies the design and manufacture of the road rollers as the central frame part is identical in its basic arrangement for all road rollers which are required and it is sufficient to attach to said central frame part the various types of replaceable units, which are steered and driven from the central frame part and incorporate a transmission powered from the central frame part.

Illustrative embodiments of the invention are shown on the drawing.

FIGS. 1 and 2 are, respectively, a side elevation and a top plan view showing diagrammatically a road roller according to the invention, and FIGS. 3 to 10 show different embodiments of replaceable roller units.

As is apparent from FIGS. 1 and 2, the road roller comprises a self-supporting central frame part 1 and replaceable roller units 2 and 3, which respectively comprise a front roller unit 4 and a rear roller unit 5. These replaceable units 2 and 3 are detachably connected to the central frame part 1 at the flanges 6 by screw fasteners so that the units 2 and 3 can be replaced. The connection by screws may be replaced by a welded joint if a replacement is not very often required.

The central frame part 1 carries a main drive means including a drive motor, which is not shown and consists preferably of a Diesel engine and a pump, e.g., an axial piston pump, driven at constant speed by the motor which permits of a stepless control of the flow rate of a hydraulic fluid while the motor is operated at a constant speed. If both the front roller unit and the rear roller unit are driven, the hydraulic fluid discharged by said pump is supplied in suitable pressure conduits to the hydraulic motors provided in units 2 and 3. If only one roller unit is driven, only the motor of the corresponding unit is connected in the hydraulic system. The same principle of construction is applied to the steering of the road roller. Steering is controlled by the steering wheel 7 which is coupled to transmission means incorporated in the units 2 and 3 to act on the pivot pins 8 of the attached units 2 and 3 after a suitable connection has been established. It is apparent that the central frame part 1 can be combined as desired with different roller units to form greatly differing road rollers.

FIGS. 3 to 10 show illustrative embodiments of replaceable units 2 and 3. FIG. 3 shows a steerable rear axle unit 5, which is adapted to be driven by a hydraulic motor 9 and carries a vibrator 10. The replaceable unit shown in FIG. 4 is similar to the replaceable unit shown in FIG. 3 but roller 5 cannot be steered and has no vibrator.

FIGS. 5 and 6 are, respectively, a side elevation and front elevation showing a roller unit provided with rubber-tire wheels. This roller unit can be steered via the pivot pin 8 and driven by the motor 9.

A roller unit having two lateral rollers is shown in FIGS. 7 and 8 in a side elevation and front elevation, respectively. This roller unit cannot be steered. FIGS. 9 and 10 show combined rollers which may be selectively used with a roller with a vibrator. Whereas the present embodiment cannot be steered, such a unit obviously can also be designed to be steerable.

It is apparent that different combinations of replaceable units 2 and 3 with the central frame part 1 can be selected and will provide road rollers which meet all requirements whereas the basic frame structure need not be designed for a specific type of road roller.

What is claimed is:

1. A modular road roller comprising
   (a) a central frame part unit having a front end and a rear end, each end having a connecting flange and the central frame part unit having no wheels,
   (b) a main drive means including a hydraulic pump carried by the central frame part unit,
   (c) steering control means carried by the central frame part unit,
   (d) a first replaceable roller unit including a frame part having a connecting flange detachably mounted on the connecting flange of the central frame part unit at the front end thereof and comprising a front roller,
   (e) a second replaceable roller unit including a frame part having a connecting flange detachably mounted on the connecting flange of the central frame part unit at the rear end thereof and comprising a rear roller, (f) a hydraulic motor incorporated in at least one of the roller units, the hydraulic motor being connected to the hydraulic pump to be powered thereby for driving the roller of the one unit, and (g) a hydraulic steering means incorporated in at least one of the roller units, the steering means being operatively connected to the steering control means for steering the roller of the one unit.

2. The modular road roller of claim 1, wherein each of the roller units incorporates a hydraulic motor connected to the hydraulic pump for driving the front and rear rollers.

3. The modular road roller of claim 1, wherein each of the roller units incorporates a hydraulic steering means for steering the front and rear rollers.

* * * * *